(12) United States Patent
Tardo et al.

(10) Patent No.: US 7,600,122 B2
(45) Date of Patent: Oct. 6, 2009

(54) METHODS AND APPARATUS FOR ACCELERATING SECURE SESSION PROCESSING

(75) Inventors: Joseph Tardo, Palo Alto, CA (US); Mark Buer, Gilbert, AZ (US); Jianjun Luo, Sunnyvale, CA (US); Don Matthews, Morgan Hill, CA (US); Zheng Qi, Milpitas, CA (US); Ronald Squires, Castro Valley, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/593,102

(22) Filed: Nov. 6, 2006

(65) Prior Publication Data

US 2007/0055875 A1 Mar. 8, 2007

Related U.S. Application Data

(63) Continuation of application No. 11/286,111, filed on Nov. 23, 2005, now Pat. No. 7,134,014, which is a continuation of application No. 10/160,143, filed on May 31, 2002, now Pat. No. 7,007,163.

(51) Int. Cl.
*G06F 9/00* (2006.01)
(52) U.S. Cl. .................. 713/171; 713/185; 713/172
(58) Field of Classification Search ................ 713/171, 713/181, 182, 185
See application file for complete search history.

(56) References Cited

U.S. PATENT DOCUMENTS

| | | | |
|---|---|---|---|
| 5,519,608 A | 5/1996 | Kupiec | |
| 5,640,193 A | 6/1997 | Wellner | |
| 5,673,322 A | 9/1997 | Pepe et al. | |
| 5,796,836 A | 8/1998 | Markham | |

OTHER PUBLICATIONS

"Secure Products VMS115", VLSI Technology, Inc., Printed in USA, Document Control: VMS115, VI, 0, Jan. 1999, pp. 1-2.
"VMS115 Data Sheet", VLSI Technology, Inc. a subsidiary of Philips Semiconductors, Revision 2:3, Aug. 10, 1999, pp. 1-64.
Senie, D. "NAT Friendly Application Design Guidelines", Amaranth Networks, Inc., NAT Working Group, Internet-Draft, Sep. 1999, pp. 1-7.
Floyd, Sally, et al., "Random Early Detection Gateways for Congestion Avoidance", Lawrence Berkeley Laboratory, University of California, IEEE/ACM Transactions on Networking, Aug. 1993, pp. 1-32.
Egevang, K., et al., "The IP Network Address Translator (NAT)", Network Working Group, May 1994, pp. 1-10.
Pall, G..S., et al., "Microsoft Point-to Pint Encryption (MPPE) Protocol", Microsoft Corporation, Network Working Group, Internet Draft, Oct. 1999, pp. 1-12.

(Continued)

*Primary Examiner*—Thomas Peeso
(74) *Attorney, Agent, or Firm*—Sterne, Kessler, Goldstein & Fox P.L.L.C.

(57) ABSTRACT

Methods and apparatus are provided for an entity such as a CPU to efficiently call a cryptography accelerator to perform cryptographic operations. A function call causes the cryptography accelerator to execute multiple cryptographic operations in a manner tailored for specific processing steps, such as steps during a handshake phase of a secured session. The techniques provide efficient use of hardware processing resources, data interfaces, and memory interfaces.

19 Claims, 7 Drawing Sheets

OTHER PUBLICATIONS

Deutsch, P., "DEFLATE Compressed Data Format Specification Version 1.3", Aladdin Enterprises, Network Working Group, May 1996, pp. 1-17.

Kent, S., "IP Authentication Header", Network Working Group, Nov. 1998, pp. 1-22.

Kent, S., "IP Encapsulating Security Payload (ESP)", Network Working Group, Nov. 1998, pp. 1-22.

Maughan, D., et al., "Internet Security Association and Key Management Protocol (ISAKMP)", Network Working Group, Nov. 1998, pp. 1-20.

Harkins, D., et al., "The Internet Key Exchange (IKE)", Cisco Systems, Network Working Group, Nov. 1998, pp. 1-12.

Srisuresh, P., "Security Model with Tunnel-mode Ipsec for NAT Domains", Lucent Technologies, Networking Group, Oct. 1999, pp. 1-11.

Shenker, S., "Specification of Guaranteed Quality of Service", Network Working Group, Sep. 1997, pp. 1-20.

Srisuresh, P., et al., "IP Network Address Translator (NAT) Terminology and Considerations", Lucent Technologies, Network Working Group, Aug. 1999, pp. 1-30.

Kent, S., et al., "Security Architecture for the Internet Protocol", Network Working Group, Nov. 1998, pp. 1-66.

"Compression for Broadband Data Communications", BlueSteel Networks, Inc., Sep. 8, 1999, pp. 1-9.

"Securing Broadband Communications" BlueSteel Networks, Inc., Sep. 8, 1999, pp. 1-10.

Analog Devices: "ADSP2141 SafeNetDPS User's Manual, Revision 6", Analog Devices Technical Specifications, Mar. 2000, XP002163401, 87 pages.

C. Madson, R. Glenn: "RFC 2403—The Use of HMAC-MD5-96 within ESP and AH", IETF Request for Comments, Nov. 1998, XP002163402, Retrieved from Internet on Mar. 20, 2001, http:///www.faqs.org/rfcs/frc2403.html, 87 pages.

S. Kent, R. Atkinson: "RFC 2406-IP Encapsulating Security Payload (ESP)" IETF Request for Comments, Nov. 1998, XP002163400, Retrieved from the Internet on Mar. 20, 2001, http://www.faqs.org/rfcs/frc2406.html, 5 pages.

Keromytis, et al., "Implementing IPsec", Global Telecommunications Conference (Globecom), IEEE, Nov. 3, 1997, pp. 470-474.

Pierson, et al., "Context-Agile Encryption for High Speed Communication Networks", Computer Communications Review, Association for Computing Machinery, vol. 29, No. 1, Jan. 1999, pp. 35-49.

Sholander, et al., "The Effect of Algorithm-Agile Encryption on ATM Quality of Service", Global Telecommunications Conference (Globecom), IEEE, Nov. 3, 1997, pp. 1948-1952.

Smirni, et al., "Evaluation of Multiprocessor Allocation Policies", Technical Report, Vanderbilt University, Online, 1993, pp. 1-21.

Tarman, et al., "Algorithm-Agile Encryption in ATM Networks", IEEE Computer, Sep. 1998, vol. 31, No. 1, pp. 57-64.

Wassal, et al., "A VLSI Architecture for ATM Algorithm-Agile Encryption", Proceedings Ninth Great Lakes Symposioum on VLSI, Mar. 4-6, 1999, pp. 325-328.

Analog Devices "Analog Devices and IRE Announce First DSP-Based Internet Security System-On-A-Chip", Analog Devices Press Release, Online, Jan. 19, 1999, pp. 1-3. http://content.analog.com/pressrelease/prddisplay/0,1622,16,00.html.

3Com: "SCom Launches New Era of Network Connectivity", 3Com Press Release, Jun. 14, 1999, pp. 1-3.

Bruce Schneier, John Wiley & Sons, "Applied Cryptography", Chapter 8, "Key Management", pp. 169-188, Copyright © 1996 by Bruce Schneier ISBN 0-471-12845-7, ISBN 0-471-11709-9.

Federal Information Processing Standards Publication 197, Nov. 26, 2001, "Specification for the Advanced Encryption Standards (AES)", pp. ii-iv and pp. 1-47.

Dierks et al., "The TLS Protocol Version 1.0" Network Working Group Request for Comments: 2246, Copyright ©, The Internet Society (1999) All rights reserved, pp. 1-69.

METHODS AND APPARATUS FOR ACCELERATING SECURE SESSION PROCESSING

CROSS-REFERENCE TO RELATED APPLICATION(S)

This application is a continuation of U.S. patent application Ser. No. 11/286,111, filed Nov. 23, 2005, now U.S. Pat. No. 7,134,014, which is a Continuation Application of U.S. patent application Ser. No. 10/160,143, filed on May 31, 2002; each of which are incorporated herein by reference in their entireties.

BACKGROUND OF THE INVENTION

1. Field of the Invention

The present application relates to cryptography operations. More specifically, the present application relates to methods and apparatus for performing cryptographic operations tailored to specific processing steps.

2. Description of Related Art

Conventional software and hardware designs for implementing many secure communications protocols such as Secure Sockets Layer (SSL) and Transport Layer Security (TLS) are inefficient. One design for performing specific processing steps during a handshake phase of a secured session entails frequent communications between a CPU and a cryptography accelerator. Sending messages back and forth between a CPU and a cryptography accelerator can significantly impair system performance and complicate software development. Many inefficiencies are introduced by having to send and receive data multiple times.

A variety of techniques for performing cryptographic operations such as key generation and finished message processing have been inefficient and resource intensive. Secured sessions and cryptographic operations are described in Applied Cryptography, Bruce Schneier, John Wiley & Sons, Inc. (ISBN 0471128457), NIST Federal Information Processing Standard FIPS-197 (AES), and Internet Engineering Task Force (IETF) Request for Comments Standard RFC2246 (TLS), the entireties of which are incorporated by reference for all purposes.

It is therefore desirable to provide methods and apparatus for improving cryptographic operations with respect to some or all of the performance limitations noted above.

SUMMARY OF THE INVENTION

Methods and apparatus are provided for an entity such as a CPU to efficiently call a cryptography accelerator to perform cryptographic operations. A function call causes the cryptography accelerator to execute multiple cryptographic operations in a manner tailored for specific processing steps, such as steps during a handshake phase of a secured session. The techniques provide efficient use of hardware processing resources, data interfaces, and memory interfaces.

According to various embodiments, a method for deriving key information in a cryptography accelerator is provided. Random information and protocol information associated with an initialize session input message is received. Master secret information is generated using the random information and the protocol information from the initialize session input message. A plurality of sessions keys are generated using processed protocol information and the master secret information. An initialize session output message corresponding to the input message is sent. A plurality of session keys are associated with the initialize session output message.

In another embodiment, a cryptography accelerator for deriving key information is provided. The cryptography accelerator includes an interface operable to receive random information and protocol information associated with an initialize session input message and a cryptographic core configured to generate master secret information using the random information and the protocol information from the initialize session input message. The cryptographic core is further configured to generate a plurality of sessions keys using processed protocol information and the master secret information. The interface is further operable to send an initialize session output message corresponding to the input message. A plurality of session keys are associated with the initialize session output message.

According to other embodiments, a method for performing cryptography processing in a cryptography accelerator during a secured session between a client and a server is provided. Handshake information is received from a first entity associated with the cryptography accelerator. A first set of authentication operations are performed to generate client verification information using the handshake information from the client. A second set of authentication operations are performed to generate server verification information. The client verification information and the server verification information is provided in a response corresponding to the handshake information received from the first entity associated with the cryptography accelerator.

In still other embodiments, a cryptography accelerator for performing cryptography processing during a secured session between a client and a server is provided. The cryptography accelerator includes an interface and a cryptographic core. The interface is operable to receive handshake information from a first entity associated with the cryptography accelerator. The cryptographic core is configured to perform a first set of authentication operations to generate client verification information using the handshake information from the client and perform a second set of authentication operations to generate server verification information. The interface is further operable to provide the client verification information and the server verification information in a response corresponding to the handshake information received from the first entity.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

The present application relates to implementing a cryptography accelerator. More specifically, the present application relates to methods and apparatus for providing a cryptography accelerator capable of performing secure session operations.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of SSL or TLS using the DES, AES, and RC4 encryption algorithms and the SHA-1 and MD5 authentication algorithms. However, it should be noted that the techniques of the present invention can be applied to a variety of different authentication and cryptography operations for cryptography processing in general. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
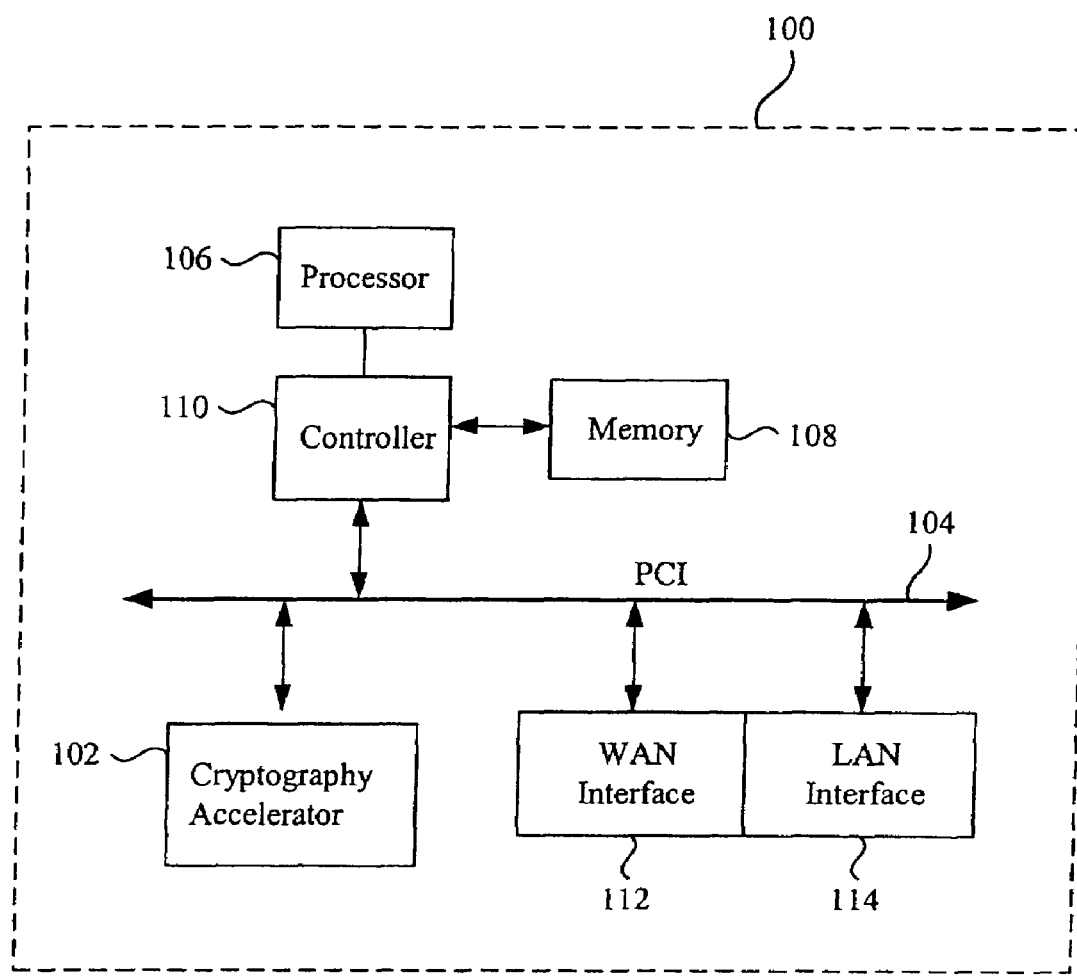
FIG. 1 is a diagrammatic representation of a system that can use the techniques of the present invention.

FIG. 1 is a diagrammatic representation of one example of a processing system 100 in accordance with an embodiment of the present invention. As shown in FIG. 1, the present invention may be implemented in a stand-alone cryptography accelerator 102 or as part of the system 100. Any logic, mechanism, or device operable to perform encryption, decryption, and/or authentication operations is referred to herein as a cryptography accelerator. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110.

Although the processing unit 106 may be the central processing unit (CPU) of a system 100, it does not necessarily have to be the CPU. It can be one of a variety of processors in a multiprocessor system. In one example, a LAN interface 114 is provided to couple the processing system 100 to a local area network (LAN) to allow packet receipt and transmission. Similarly, a Wide Area Network (WAN) interface 112 can also be provided to connect the processing system to a WAN (not shown) such as the Internet. The WAN interface manages in-bound and out-bound packets to allow automatic decryption and authentication processing.

According to various embodiments, the cryptography accelerator 102 is an application specific integrated circuit (ASIC) coupled to the processor 106. The cryptography accelerator 102 can also be a programmable logic device (PLD), field programmable gate array (FPGA), or other device coupled to the processor 106. According to specific embodiments, the cryptography accelerator 102 is implemented either on a card connected to the bus 104 or as a standalone chip integrated in the system 100.

In other embodiments, the cryptography accelerator 102 itself is integrated into the processing core of a CPU of system 100, such as that available from Tensilica Corporation of Santa Clara, Calif. or MIPS Technologies of Mountain View, Calif. In another embodiment, techniques and mechanisms of the present invention are integrated into a CPU such as a CPU available from Intel Corporation of San Jose, Calif. or AMI Corporation of Sunnyvale, Calif. By implementing cryptography accelerator functionality entirely on the processor 106, a separate card or chip in the system 100 is not needed. In still other embodiments, the processing system 100 including the cryptography accelerator 102 is implemented as a system on a chip (SOC). The network interfaces, memory, processing core, and cryptography accelerator functionality are provided on a single integrated circuit device.

The cryptography accelerator 102 is capable of implementing various network security standards, such as SSL and TLS, which provide application-transparent encryption and authentication services for network traffic. Note that, throughout, all references to SSL also apply to TLS.

Network security standards such as SSL provide authentication through the use of hash algorithms and encryption through the use of encryption algorithms. Two commonly used hash algorithms are MD5 and the Secure Hash algorithm (SHA-1). Other hash algorithms such as MD4 and MD2 are also available. Two commonly used encryption algorithms are DES and RC4. Other encryption algorithms such as triple DES and AES, are also available. Authentication and encryption algorithms are described in Applied Cryptography, Bruce Schneier, John Wiley & Sons, Inc. (ISBN 0471128457), NIST Federal Information Processing Standard FIPS-197 (AES), and Internet Engineering Task Force (IETF) Request for Comments Standard RFC2246 (TLS), the entireties of which are incorporated by reference for all purposes. Even though many network security standards apply the same hash algorithms, different approaches are taken toward applying the hash algorithms to the actual authentication computation.

Protocols such as SSL specify performing operations to derive keys for data exchange, generate messages for key and data exchange verification, process records, etc. In typical implementations, performing operations for secured sessions entails making various functional calls to a cryptography accelerator. In various embodiments, a processor such as a CPU implements software code for cryptography operations. The CPU periodically issues function calls to the cryptography accelerator to perform specific operations, such as DES processing, for example. Performing cryptography operations using the specialized cryptography accelerator typically improves the efficiency of cryptography processing.

However, issuing function calls to a cryptography accelerator is not without cost. In order to process data in a cryptography accelerator, data is generally copied from the memory space of the CPU to the memory space of the cryptography accelerator. Various bus, memory, and interface resources are consumed during various data transfers. Context information for cryptogrtaphy processing in the cryptography accelerator is also loaded and reloaded when the cryptography accelerator is called. Factors such as copying and loading reduce system efficiency and complicate software development.

According to various embodiments of the present invention, specific characteristics of cryptographic sessions such as secured sessions are recognized to provide for improved efficiency in a system using a cryptography accelerator. Instead of using a large number of low level operations to derive communication keys, encrypt, decrypt, and compute authentication codes, a reduced set of instructions are provided to reduce the amount of bus traffic, make possible highly efficient system designs, and simplify software development.

Figure 2:
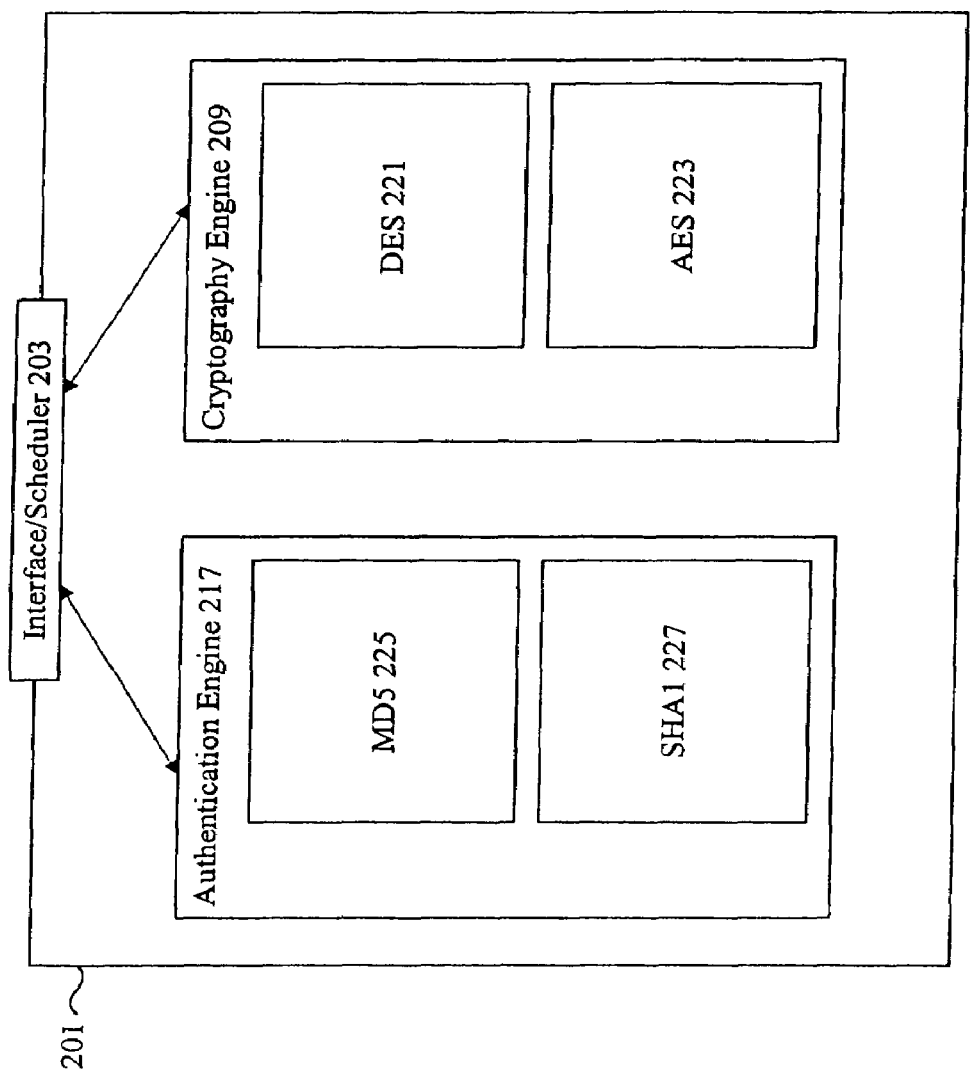
FIG. 2 is a diagrammatic representation of an integrated circuit containing processing cores for performing authentication and cryptography operations.

FIG. 2 is a diagrammatic representation of one example of a cryptography accelerator 201. The cryptography accelerator 201 includes an interface 203 connected to a host such as an external processor. According to various embodiments, the interface 203 receives information from the host for processing and sends information to the host when processing is completed. In one example, encrypted data associated with an SSL exchange is received through the interface. The interface 203 includes a scheduler for determining whether to send data blocks to various processing engines such as authentication engine 217 and cryptography engine 209. In one embodiment, encryption engine 209 includes components such as a DES engine 221 and an AES engine 223. An authentication engine 217 includes components such as MD5 engine 225 and SHA1 engine 227. It should be noted that a cryptography accelerator 201 can include other components as well, such as a public key engine or key generation cores for performing other authentication and encryption algorithms.

According to various embodiments, components for performing operations such as XOR operations are also included in the cryptography accelerator. In one example, an XOR component is included in the authentication engine so that SHA-1 and MD5 processed data can be combined together.

According to various embodiments, the techniques of the present invention are used in a secured session. Any message exchange sequence between two parties using both authentication and encryption and common session information known to both parties is referred to herein as a secured session. In one example, a secured session is an SSL session. A secured session typically includes a handshake phase and a data exchange phase. A handshake phase often includes a key exchange sequence establishing common information, such as a shared key, for the transmission of data during the data exchange phase between two parties. Any mechanism involving exchanging information to establish a secured session between two entities is referred to herein as a handshake phase. According to various embodiments, the techniques of the present invention apply to the handshake phase.

Figure 3:
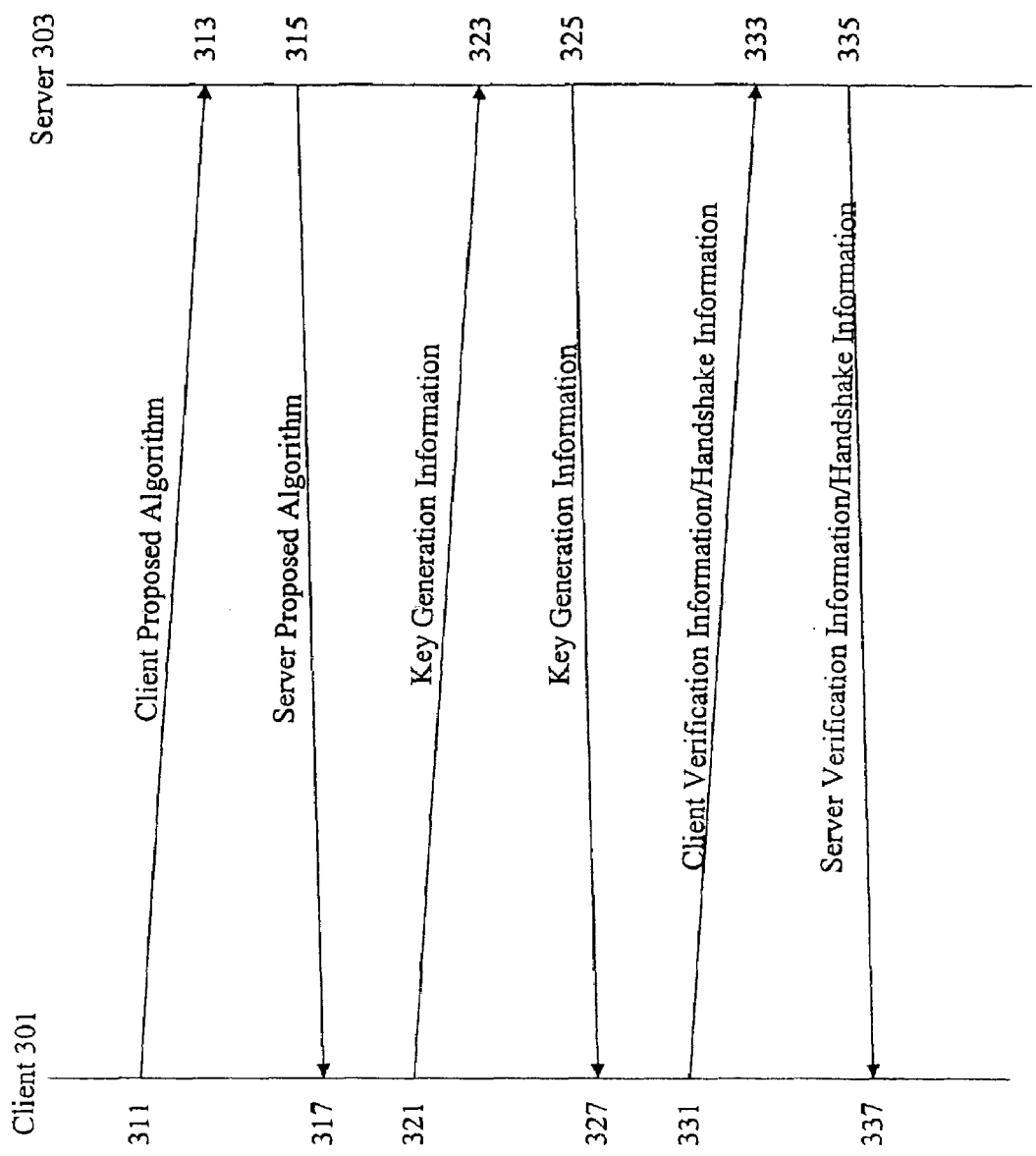
FIG. 3 is an interaction diagram showing a sequence in which the techniques of the present invention can be applied.

FIG. 3 is a transaction diagram showing one example of a handshake phase associated with SSL. A wide variety of sequences associated with handshake phases are available. At 311, the client 301 transmits a message with a security enable parameter to a server 303. In one embodiment, the authentication message contains an identifier such as a user name or an authentication identifier that allows the receiver to select an authentication mechanism out of a possible set of mechanisms. In another embodiment, the client sends an SSL version number, cipher settings, and client random information to the server 303. Server 303 may or may not already have information associated with the client. The server 303 identifies the security enable parameter along with any client proposed algorithms and proposes algorithms for encryption, for authentication, and for exchange or agreement of the cryptographic keys.

According to various embodiments, at 315 the server sends the server's own SSL version number, cipher settings, and server random information to the client 301. In one embodiment, the server also sends its certificate. A certificate may be a hash of a combined public key and identifier associated with the server encrypted with a trusted third party key. If the client is requesting a server resource that requires client authentication, the server at this point can also request that the client provide a certificate along with a digital signature. According to other embodiments, protocol version, session ID, cipher suite, and compression method are exchanged along with client random information and server random information.

At 317, client 301 uses the information sent by the server to authenticate the server. The client then generates a pre-master secret for the session, encrypts the pre-master secret with the server's public key obtained from the server certificate, and sends the encrypted pre-master secret to the server at 321. In one embodiment, the client computes a pre-master secret using cryptographic hardware to generate a random number. Information such as a pre-master secret or a client random sequence used to derive session keys is referred to herein as key generation information. In one example, a pre-master secret is used by both the server and the client to derive a master secret which is then used subsequently to derive session keys. Any intermediate information used to derive session keys from key generation information is referred to herein as master secret information.

According to various embodiments, master secret information is not transmitted over the network during a handshake phase but is instead derived independently by both a client entity and a server entity. If the server requested client authentication, the client signs a piece of data that is unique to this handshake and known by both the client and server and sends both the signed information and the client's own certificate to the server. According to various embodiments, the client signs a piece of data unique to the handshake by performing a hash.

According to various embodiments, the server 303 at 325 attempts to authenticate the client if client authentication was requested. If the client can not be authenticated, the session is terminated. If the client can be authenticated, the server 303 uses the key generation information from the client to generate session keys. In one example, the server 303 uses its private key to decrypt the pre-master secret. Both the server 303 and the client 301 use key generation information such as the pre-master secret to generate a master secret and subsequently to generate the session keys. In typical implementations, a function call is issued to a cryptography accelerator to derive a master secret from a pre-master secret. According to various embodiments, the function call parameters include protocol information and key generation information such as the pre-master secret, client random number, and server random number exchanged during the handshake.

The cryptography accelerator sends back a master secret. According to various embodiments, the cryptography accelerator sends the master secret back to a CPU running SSL software. The techniques of the present invention recognize that the master secret is not information that the CPU needs at this point. Instead of consuming valuable system resources such as bus, memory, and interface resources, the techniques of the present invention contemplate not sending the master secret back to the CPU. In typical implementations, the CPU stores the master secret and then performs context processing in order to provide protocol information to a cryptography accelerator to determine session keys. The CPU then sends the master secret along with processed protocol information to the cryptography accelerator.

The cryptography accelerator then generates the session keys. In one embodiment, the cryptography accelerator generates a client encryption key, a server encryption key, a client authentication key, and a server authentication key. According to various embodiments, the techniques of the present invention allow a CPU to issue a single function call with a pre-master secret to derive both the master secret and the session keys. Input messages passed to a cryptography accelerator associated with a single function used to derive session keys using key generation information are referred to herein as initialize connection state input messages, initialize session input messages, or initialization input messages. Output messages passed from a cryptography accelerator associated with a single function used to derive session keys using key generation information are referred to herein as initialize connection state output messages, initialize session output message, or initialization output messages.

At 327, the session keys generated at both the client and the server are used to establish the secure session. According to various embodiments, cryptography accelerators associated with both client 301 and server 303 derive keys based on the selected algorithm or algorithms. According to various embodiments, the session keys can be used for communications between client 301 and server 303. It should be noted that a variety of different authentication sequences and communication sequences in general can use the techniques of the present invention. For example, only a single session key may be generated in some instances.

At 331, client 301 sends handshake information to the server 303. Any information transmitted for determining that the session keys generated at the server and the session keys generated at the client are the same set of keys is referred to herein as handshake information or verification information. In one example, a server 303 receives from the client 301 handshake information including a hash of the session keys combined with other key generation information. The server 303 then calculates client verification information using the session keys it generated. If the handshake information corresponds with the client verification information generated at the server, verification is completed. Information generated by the server for comparison with handshake information sent from the client to determine that the client has the correct set of session keys is referred to herein as handshake information, client verification information, or client finished information.

In another example, the server issues a function call to a cryptography accelerator that hashes the combination of a verification message received from the client, protocol information, and a master secret to generate client verification information. The cryptography accelerator then sends the client verification information back to the server CPU. At 333, the server typically decrypts any message associated with client verification information received from the client entity 301 and compares the decrypted message with the generated client verification information to determine that the client verification information matches. The server then typically issues a function call to a cryptography accelerator to generate a server verification message.

Information generated by a server and sent to a client to determine that the server has the correct set of session keys is referred to herein as handshake information, server verification information or server finished information. In one example, the server CPU sends handshake information received from the client and client verification information to a cryptography accelerator that computes the server verification information. It should be noted that padding as well as other context information may be included in a variety of function calls and computations even if it is not explicitly stated.

It should be noted that in the above implementation, a master secret is never transmitted over the network. Instead, both network entities use derivatives of the pre-master secret to generate the session keys and other cryptographic information used for secure transmission. Both the master secret and the session keys need not ever be transmitted over the network.

According to various embodiments, the techniques of the present invention increase the efficiency of operations during a data exchange associated with a key exchange. In one example, efficiency is increased by reducing the number of function calls a server entity or a client entity makes during a handshake phase. By recognizing the unique characteristics of various secured sessions, operations such as the generation of client verification messages and server verification messages can be combined into a single function call by a CPU to a cryptography accelerator. Master secret generation and session key generation can also be combined into a single function call. Bus traffic and resource usage is reduced.

It is contemplated that a cryptography accelerator can be used in any network entity including client and server entities. It should be noted that the authentication sequence shown in FIG. 3 is only one example of a sequence that can use the mechanisms and techniques of the present invention. In one example, both server and client can access key generation information from a third party source in order to derive information for a data exchange. In another example, client random numbers may be included in a client proposed algorithm message instead of a key generation information message.

Figure 4:
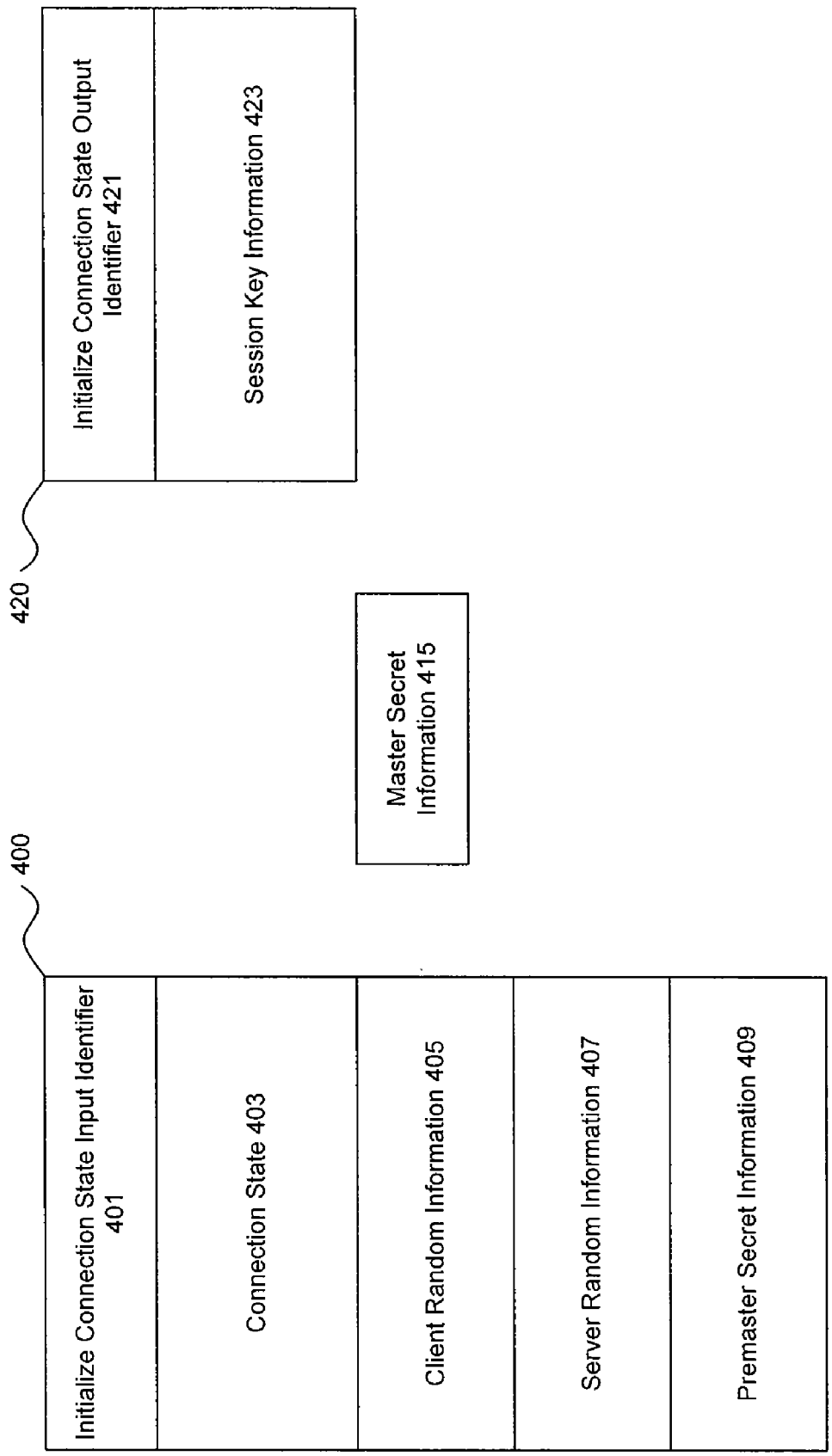
FIG. 4 is a diagrammatic representation showing input and output messages for session key generation

As noted above, an entity such as a CPU sends an input message to a cryptography accelerator in order to derive session keys. The cryptography accelerator uses information in the input message, performs various cryptographic operations, and provides an output message to CPU. FIG. 4 is a diagrammatic representation showing on example of input and output messages for generating session keys. According to various embodiments, an initialize connection state input message or an initialize session input message 400 includes an initialize connection state input identifier 401 and connection state information 403, which could be in the form of data structure templates to be filled in by the hardware. The initialize connection state information 403 includes parameters such as flags and sequence numbers.

The initialize session input message 400 also includes information for generating keys such as client random information 405, server random information 407, and pre-master secret information 409. In typical implementations, the cryptography accelerator takes the pre-master secret and other protocol information received from an entity such as a CPU and outputs a message that includes a master secret 415 to the entity. According to various embodiments, however, the cryptography accelerator processes protocol information instead of outputting a message including the master secret to the entity. The cryptography accelerator instead uses the master secret and the processed protocol information to derive session keys. An output message 420 includes an initialize connection state output identifier 421 and session key information 423 that may include client encryption keys, server encryption keys, server authentication keys, and client authentication keys.

Figure 5:
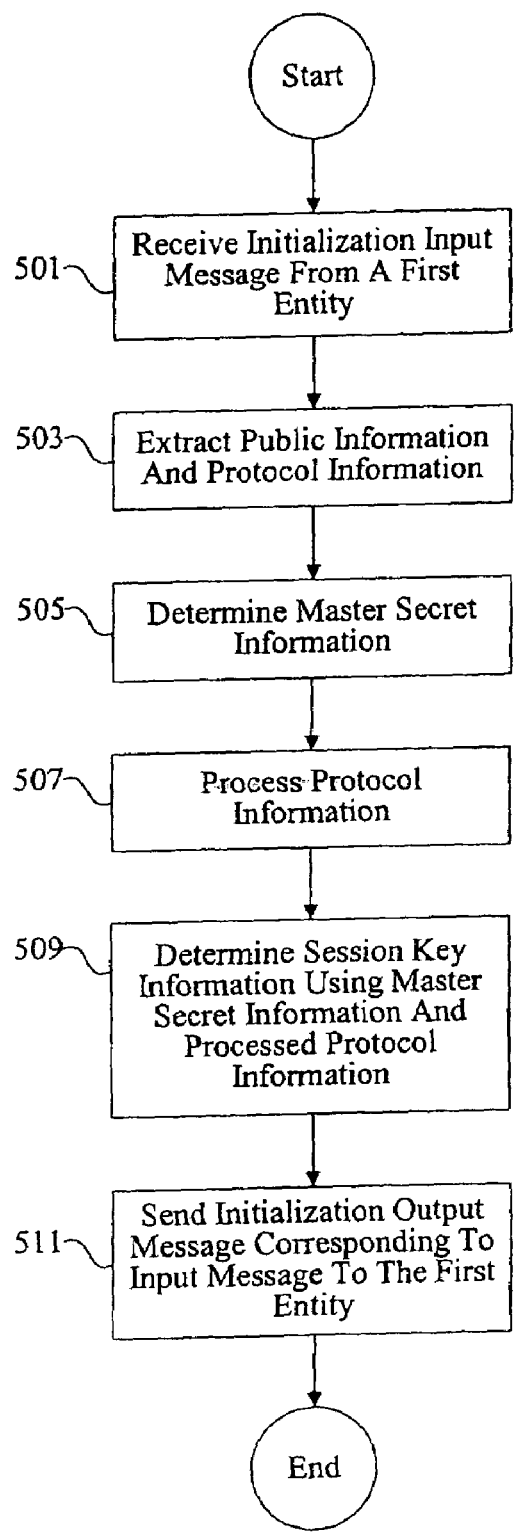
FIG. 5 is a flow process diagram showing techniques for initializing a connection state.

FIG. 5 is a process flow diagram showing techniques for generating a session key. At 501, a cryptography accelerator receives an initialization input message from a first entity. In one embodiment, the first entity is a functional core on a programmable chip and the cryptography accelerator is another functional core on a programmable chip. At 503, information for generating keys along with protocol information is extracted. In one embodiment, all the information is contained in a single input message from the first entity. In another embodiment, some of the information may have already arrived at the cryptography accelerator. At 505, master secret information is determined. At 507, protocol information is processed. At 509, session key information is determined using the master secret information and the processed protocol information.

By processing protocol information on the cryptography accelerator, master secret information does not need to be sent to the first entity so that the first entity can process the protocol information and resend the master secret information to the cryptography accelerator. At 511, an initialization output message corresponding to the input message is sent to the first entity. The initialization output message includes session key information.

Figure 6:
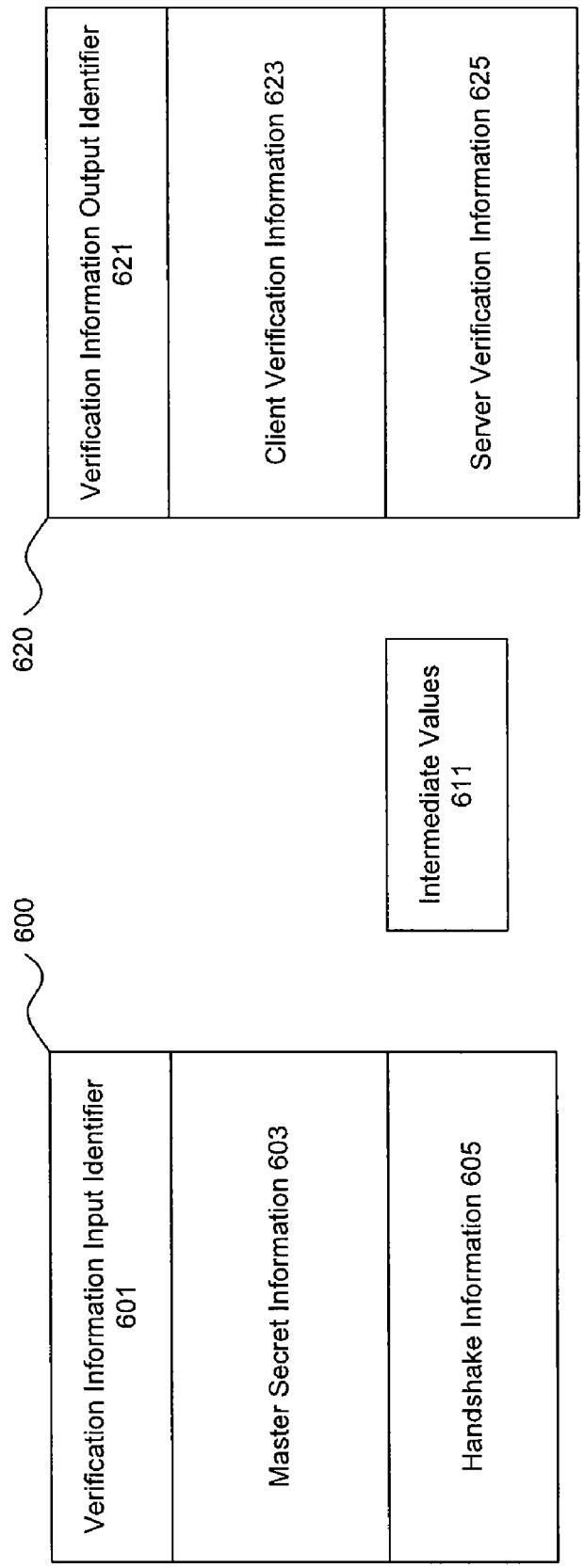
FIG. 6 is a diagrammatic representation showing input and output message for finished message processing.

FIG. 6 is a diagrammatic representation showing one example of input and output messages associated with generating verification or handshake information. According to various embodiments, processing verification messages is referred to herein as processing finished messages. The verification information input message 600 includes a verification information input identifier 601, master secret information 603, and handshake information 605. In one embodiment, the handshake information 605 is received at a server from a client after session keys have been generated. Master secret information 603 can be transmitted from the first entity to the cryptography accelerator or may be stored in the cryptography accelerator after the session key generation is completed.

In typical implementations, master secret information 603 and handshake information 605 is used to generate an intermediate value 611 that is used to generate client verification information 623. The client verification information 623 is then sent to an entity such as a CPU which compares the generated client verification information 623 with any information received from the client. The CPU then sends information to the cryptography accelerator for the cryptography accelerator to generate server verification information 625. However, the techniques of the present invention recognize that both server and client verification information can be generated in the same function call. By performing the generation of both client and server verification information in a single function call, system resource usage such as bus traffic is reduced.

According to various embodiments, the techniques of the present invention entail maintaining the client verification information 623 and the handshake information 605 to generate server verification information instead of sending the client verification information 623 to the CPU. In one embodiment, generating server verification information entails performing a hash on the handshake information 605 combined with the client verification information 623 to derive an intermediate value 611. A hash is then performed on the intermediate value to derive the server verification information 625.

Figure 7:
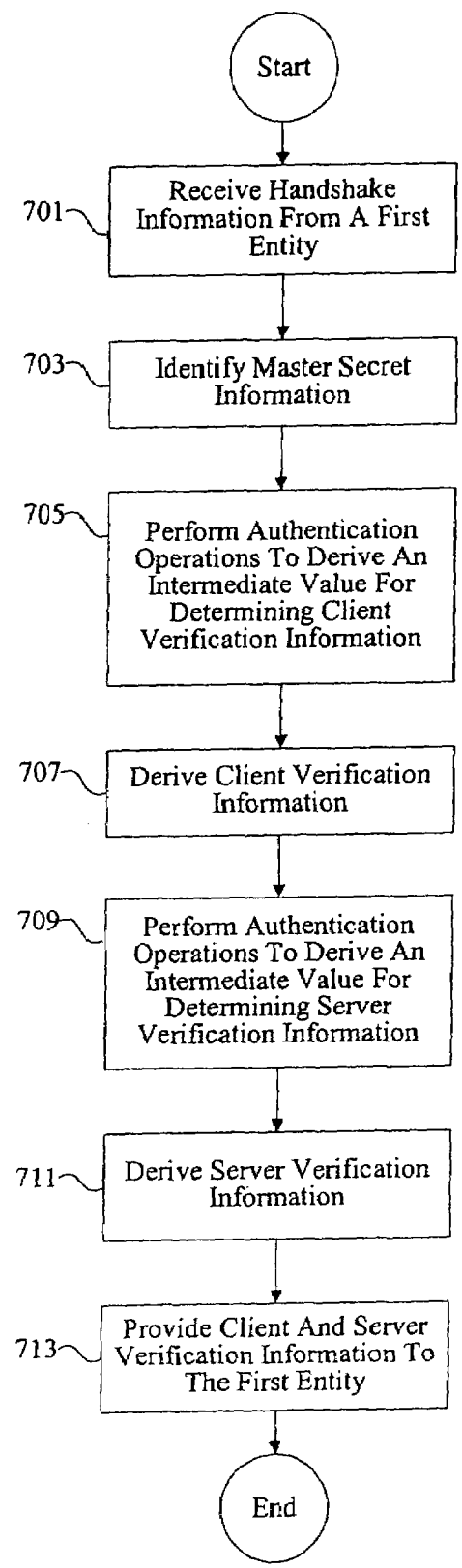
FIG. 7 is a flow process diagram showing techniques for finished message processing.

FIG. 7 is a flow process diagram showing one example of a technique for finished message processing. At 701, handshake information is received from a first entity. At 703, master secret information is identified. At 705, authentication operations are performed to derive in intermediate value for determining client verification information. In one example, the intermediate value is a hash of the handshake message combined with the protocol information and the master secret information. At 707, client verification information is derived using the intermediate value. At 709, authentication operations are performed to derive in intermediate value for determining server verification information. At 711, server verification information is derived. At 713 client and server verification information is provided to the first entity.

Although the techniques of the present invention have been described in the context of key generation and finished message processing, the cryptography accelerator of the present invention also provides function calls for performing other cryptographic operations. In particular, the cryptography accelerator may have access to private memory for storing cryptographic keys associated with a particular instance of communication. In one example, the processed record data function call is provided for encryption and decryption operations on application data using such sorted keys. In another example, the processed record data function call is provided for encryption and decryption operations on application data using explicitly provided keys. In yet another example, a client certificate verify function call is provided for a client to efficiently authenticate a server or vice versa. In still another example, a process generic buffer function call is provided to perform encryption and decryption operations without encapsulation and decapsulation. A variety of function calls can use the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method for establishing a secure communications channel between a first entity and a second entity, comprising:
   (a) receiving a first message from the first entity, wherein the first message includes a first set of security parameters;
   (b) transmitting a second message to the first entity, wherein the second message includes a second set of security parameters;
   (c) receiving a negotiation key from the first entity in response to the second message;
   (d) issuing a function call to a cryptographic processing module, wherein the function call includes the first set of security parameters, the second set of security parameters, and the negotiation key, wherein the function call causes the cryptographic processing module to generate a master key and a set of server session keys;
   (e) receiving the set of server session keys from the cryptographic processing module; and
   (f) engaging in secure communications with the first entity using the server session keys.

2. The method of claim 1, further comprising:
   maintaining the master key within the cryptographic processing module.

3. The method of claim 1, further comprising, prior to step (f):
   receiving a verification message from the first entity, wherein the verification message includes a client authentication parameter;
   issuing a second function call to the cryptographic processing module, wherein the second function call causes the cryptographic processing module to generate a server authentication parameter; and
   comparing the client authentication parameter to the server authentication parameter to determine whether the key negotiation process of steps (a) through (e) was successful.

4. The method of claim 3, wherein the client authentication parameter includes a cryptographic hash of a set of client session keys.

5. The method of claim 3, wherein the server authentication parameter includes a cryptographic hash of the set of server session keys.

6. The method of claim 1, further comprising, prior to step (f):

issuing a second function call to the cryptographic processing module, wherein the second function call causes the cryptographic processing module to generate a server authentication parameter; and transmitting the server authentication parameter to the first entity for authentication.

7. A method for establishing a secure communications channel between a first entity and a second entity, comprising:

(a) transmitting a first message to the second entity, wherein the first message includes a first set of security parameters;

(b) receiving a second message from the second entity, wherein the second message includes a second set of security parameters;

(c) generating a negotiation key using at least a portion of the second set of security parameters;

(d) transmitting the negotiation key from the first entity in response to the second message;

(e) issuing a function call to a cryptographic processing module, the function call including the first set of security parameters, the second set of security parameters, and the negotiation key, wherein the function call causes the cryptographic processing module to generate a master key and a set of client session keys;

(f) receiving the set of client session keys from the cryptographic processing module; and (g) engaging in secure communications with the second entity using the client session keys.

8. The method of claim 7, further comprising:

maintaining the master key within the cryptographic processing module.

9. The method of claim 7, further comprising, prior to step (g):

issuing a second function call to the cryptographic processing module, wherein the second function call causes the cryptographic processing module to generate a client authentication parameter; and transmitting the client authentication parameter to the second entity for authentication.

10. The method of claim 7, further comprising, prior to step (g):

receiving a verification message from the second entity, wherein the verification message includes a server authentication parameter;

issuing a second function call to the cryptographic processing module, wherein the second function call causes the cryptographic processing module to generate a client authentication parameter; and comparing the client authentication parameter to the server authentication parameter to determine whether the key negotiation process of steps (a) through (f) was successful.

11. The method of claim 10, wherein the client authentication parameter includes a cryptographic hash of the set of client session keys.

12. The method of claim 10, wherein the server authentication parameter includes a cryptographic hash of a set of server session keys.

13. A system for establishing a security communications channel with an entity, comprising:

a cryptographic processing module configured to generate a master key and a set of session keys in response to receipt of a key generation function call; and a central processing unit coupled to the cryptographic processing module, wherein the central processing unit is configured to:

receive a set of messages from the entity, wherein the set of messages includes a set of security parameters, and issue the key generation function call to the cryptographic processing module.

14. The system of claim 13, wherein the central processing unit is further configured to receive a negotiation key from the entity.

15. The system of claim 13, wherein the central processing unit is further configured to generate a negotiation key.

16. The system of claim 13, wherein issuing the key generation function call includes the set of security parameters and a negotiation key.

17. The system of claim 13, wherein the central processing unit is further configured to issue a verification function call to the cryptographic processing module and to transmit a verification message to the entity; and wherein the cryptographic processing module is further configured to generate an authentication parameter.

18. The system of claim 13, wherein the central processing unit is further configured to receive a verification message from the entity, wherein the verification message includes a client authentication parameter, issue a verification function call to the cryptographic processing module, and perform authentication processing; and wherein the cryptographic processing module is further configured to generate an authentication parameter in response to the verification function call.

19. The system of claim 13, wherein the central processing unit is further configured to issue a verification function call to the cryptographic processing module and to transmit a verification message to the entity; and wherein the cryptographic processing module is further configured to generate an authentication parameter.

* * * * *

UNITED STATES PATENT AND TRADEMARK OFFICE
CERTIFICATE OF CORRECTION

PATENT NO. : 7,600,122 B2
APPLICATION NO. : 11/593102
DATED : October 6, 2009
INVENTOR(S) : Joseph Tardo et al.

It is certified that error appears in the above-identified patent and that said Letters Patent is hereby corrected as shown below:

In column 4, line 11, delete "AMI" and insert --AMD--, therefor.

In column 12, lines 31 to 36, delete:

"17. The system of claim 13, wherein the central processing unit is further configured to issue a verification function call to the cryptographic processing module and to transmit a verification message to the entity; and wherein the cryptographic processing module is further configured to generate an authentication parameter."

and insert therefor:

--17. The system of claim 13, wherein the cryptographic processing module is further configured to maintain the master key within the cryptographic processing module.--

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,600,122 B2　　　　　　　　　　　　　　　　　　　　　　　　Page 1 of 1
APPLICATION NO. : 11/593102
DATED : October 6, 2009
INVENTOR(S) : Tardo et al.

It is certified that error appears in the above-identified patent and that said Letters Patent is hereby corrected as shown below:

Cover Page
Item (75), Inventors, please change "Ronald Squires, Castro Valley, CA (US)" to --Ronald Squiers, Castro Valley, CA (US)--.

Signed and Sealed this

Second Day of November, 2010

David J. Kappos
*Director of the United States Patent and Trademark Office*